United States Patent [19]

Kurandt

[11] Patent Number: 4,540,439

[45] Date of Patent: Sep. 10, 1985

[54] PROCESS FOR PREPARATION OF GYPSUM SHAPES

[75] Inventor: Hans-Friedrich Kurandt, Lüneburg, Fed. Rep. of Germany

[73] Assignee: Chemische Werke Huls Aktiengesellschaft, Marl, Fed. Rep. of Germany

[21] Appl. No.: 375,709

[22] Filed: May 6, 1982

[30] Foreign Application Priority Data

May 6, 1981 [DE] Fed. Rep. of Germany ....... 3117813

[51] Int. Cl.$^3$ ...................... C04B 11/00; C04B 11/10; C01F 11/46
[52] U.S. Cl. .................................. 106/109; 106/110; 106/118; 423/555
[58] Field of Search ................ 423/555; 106/109, 110, 106/111, 118, 119, 120

[56] References Cited

U.S. PATENT DOCUMENTS

| | | | |
|---|---|---|---|
| 1,703,097 | 2/1929 | Chassevent | 106/110 |
| 2,937,926 | 5/1960 | Hanusch | 106/109 |
| 3,159,497 | 12/1964 | Yamaguchi | 106/110 |
| 3,414,462 | 12/1968 | Cafferata | 106/118 |
| 3,489,583 | 1/1970 | Bloom | 106/110 |
| 3,574,648 | 4/1971 | Wirsching et al. | 423/555 |
| 3,827,897 | 8/1974 | Dumont | 106/118 |
| 3,847,634 | 11/1974 | Vickery | 106/110 |
| 3,945,841 | 3/1976 | Dumont | 106/110 |
| 4,101,638 | 7/1978 | Inoue et al. | 423/555 |
| 4,340,521 | 7/1982 | Deleuil | 106/110 |

FOREIGN PATENT DOCUMENTS

| | | | |
|---|---|---|---|
| 1156348 | 10/1963 | Fed. Rep. of Germany | 106/110 |
| 2059413 | 4/1981 | United Kingdom | 106/109 |
| 570551 | 8/1977 | U.S.S.R. | 423/555 |
| 688466 | 9/1979 | U.S.S.R. | 106/109 |

*Primary Examiner*—Gary P. Straub
*Attorney, Agent, or Firm*—Oblon, Fisher, Spivak, McClelland & Maier

[57] ABSTRACT

A process for preparing shaped articles from waste gypsum from wet-process phosphoric acid production comprises:

(1) mixing wet calcium sulfate hemihydrate with 0.5–20% by wt. of calcium hydroxide or calcium oxide,
(2) adjusting the total water content of said mixture to 20–40% by wt., if necessary, and
(3) molding shaped articles from said mixture by compression molding.

The shaped objects so prepared have a low density and relatively high compressive strength.

8 Claims, No Drawings

PROCESS FOR PREPARATION OF GYPSUM SHAPES

BACKGROUND OF THE INVENTION

In the production of phosphoric acid by the wet process, large amounts of calcium sulfate are formed. Depending on the particular process and the reaction conditions, it is formed as the dihydrate, the hemihydrate or anhydrite. In most processes these precipitates are separated and discarded as waste. Hitherto, it was only after complicated purification processes that these precipitates could be used in the construction industry for purposes such as gypsum plaster.

Thus, the purification of phosphogypsum by the so-called hydrothermal process is known, in which the purification is carried out by conversion into calcium sulfate hemihydrate. The calcium sulfate so prepared can be compressed into gypsum bricks as in German Patent No. 23 17 049 by mixing it with a quantity of water which at least approaches, and at most is equal to, the stoichiometric amount required for hydration to the calcium sulfate dihydrate, and compression molding at a temperature between 45° and 90° C.

Another process for preparation of building materials from gypsum is described in German No. OS 28 05 523 in which 30–100% of calcined gypsum (plaster) having a Blaine surface of 500 to 15,000 cm$^2$/g is added to the moist dihydrate. Before shaping by molding can be successful, the phosphogypsum has to be purified by a complicated procedure (cf. the cited German OS, pp. 8–9 (3–4)), the plaster portion has to be prepared from the phosphogypsum by further process steps involving drying and calcining (loc. cit. pp. 11–12 (6–7)), and the wet dihydrate and plaster must be mixed in a ratio which is calculated by formula corresponding to the water content which is chosen to be between 0 and 15%.

The process of the invention for preparing shaped articles of gypsum differs from those mentioned above in that neither purification nor calcination of the phosphogypsum is necessary. Accordingly, there is no wastewater produced and no thermal energy is required.

The process of the invention is preferably used for calcium sulfate hemihydrate which is produced in the phosphoric acid processes of German OS Nos. 22 33 189, OS 23 51 031, and/or OS 24 12 503.

In these processes, it is true, a direct compression molding of the recovered hemihydrate has been possible, but the shaped articles produced have hitherto not attained the hardness which is required, for example, for the erection of bearing walls (cf. Exaxmple 2, page 8).

SUMMARY OF THE INVENTION

The improvement in the process of preparing gypsum shaped articles by this invention is provided by mixing the moist material from the filter with calcium hydroxide or calcium oxide in a proportion of 0.5 to 20% by weight, preferably 1 to 10% by weight. If the total water content of the moist hemihydrate filter cake is less than 20% by wt., water is added in such proportion that after compression molding a complete recrystallization to the dihydrate is possible.

On the other hand, if the water content is greater than 40% by wt., the sharp edges of the shaped objects prepared by compression molding, e.g., in a sand-lime brick press, will not be retained (cf. Example 3, p. 9). In this case the hemihydrate must be freed from excess water either by vigorous suction during filtering or by a rather lengthy centrifuging or other suitable processes before it is mixed with the calcium compounds and optional fillers and additives.

DETAILED DESCRIPTION OF THE INVENTION

After the addition of the calcium compounds the compression molding is carried out immediately or after a period of at most eight hours.

After a storage time of 4 hours after compression molding, the building blocks so formed already have reached practically their maximum compressive strength.

Surprisingly, it has been found that the material treated with lime sets very rapidly after compression molding and reaches a hardness which is greater than that of sand-lime bricks. Furthermore, the density of the gypsum stone is less than that of the sand-lime stone used up until now.

The mixing of lime and phosphogypsum is conveniently carried out with a conventional paddle mixer. The compression molding of the articles can be carried out with a conventional sand-lime brick press, wherein the articles can be pressed in a cycle of a few seconds. The shaped articles of the invention can be prepared in the conventional shapes and dimensions of sand-lime bricks and other construction materials. Perforated bricks can also be prepared.

Moulded gypsum articles produced according to the invention may have a density of 1.8 kg/dm$^3$ and a compression strength measured by DIN 106 of 200 kp/cm$^2$ (for the size NF=240×115×71 mm).

The incorporated water is bound as water of crystallization. The hardened material is dried without energy input and can already be used for bearing walls a few hours after pressing. Prior to molding, water repellent materials or other conventional fillers and agents can be added to improve the resistance to moisture (e.g., for use in an exterior wall).

The calcium hydroxide or calcium oxide can also be partially replaced by the corresponding magnesium compounds.

Mixtures of gypsum and calcium oxide have been prepared, of course, cf. e.g., U.S. Pat. Nos. 1,967,959; 2,021,412; 2,063,488; 2,127,952; French Patent No. 828,201, British Patent No. 492,885, and the like.

This is done, however, to dehydrate the dihydrate and thus to obtain (after water is added again) a mortar having good properties:

$$1.5\ CaO + CaSO_4 \cdot 2H_2O \rightarrow 1.5\ Ca(OH)_2 + CaSO_4 \cdot \tfrac{1}{2}H_2O$$

Of course, in the known process (as the formula illustrates) generally the dihydrate is used and, a greater proportion of CaO.

Considering the right side of the equation, mortar mixtures containing calcium sulfate hemihydrate and calcium hydroxide and calcium oxide have been known since at least 1930.

However, it has been newly discovered that the damp hemihydrate with relatively small added amounts of CaO or Ca(OH)$_2$ can be a starting mixture for the preparation of weight-bearing compression-molded articles. Since it has been known for a long time that these or similar mixtures can be used as mortar and that compression-molded building elements can be prepared by compression molding of lime-sand mixtures under defined conditions, it is surprising that such suggestions have not been made before. Building materials from gypsum have hitherto been used for the most part only in interior construction (cf. Ullmann, 3d ed., Vol. 4, p. 213).

Because of the tremendous quantities of gypsum produced every year in the fertilizer industry which have hitherto for the most part been discarded, the possibility of using the hemihydrate for load bearing compression-molded articles in the construction industry is of very great economic significance. In this connection it is also significant that it is possible by using the process of Application No. P 30 21 839.4 to purify the phosphogypsum so that building stone prepared therefrom is devoid of any radiation hazard.

By addition of water-repellant materials and/or other conventional fillers and/or additives the properties of the hemihydrate molded articles can be further improved if necessary, or adapted to special conditions (cf. Example 6).

The process of the invention for preparation of gypsum molded articles without preliminary purification, drying or calcining of the wet α-calcium sulfate hemihydrate from phosphoric acid production merely by compression molding in conventional apparatus used in the artificial stone industry is thus characterized by the following features:

(a) the hemihydrate from the filtration,
(b) whose water content is adjusted, if necessary to 20 to 40% by wt. preferably 21–29% by wt.,
(c) is mixed with calcium hydroxide or calcium oxide in a proportion of 0.5 to 20% by wt. preferably from 1 to 10% by wt., and then
(d) immediately, or after a storage period of at most eight hours,
(e) molded into shapes using apparatus conventional in the artificial stone industry, and
(f) stored for at least four hours before it is used for building purposes.

The process of the invention for preparing gypsum shapes is illustrated below by certain examples, with the understanding that the scope of protection is not to be limited to these examples.

EXAMPLE 1

Wet, as filtered, calcium phosphate hemihydrate from production of phosphoric acid, having a total water content of 23% by wt. after filtration is mixed in a paddle mixer with 5% by wt. of calcium hydroxide. The material is then pressed in a lime-sand brick press at a pressure of 80 kp/cm$^2$, placed on pallets and allowed to stand. The next day the wet-pressed bricks had a moisture content of about 1% by wt. 5,000 bricks/hour of the NF size (240×115×71 mm) were produced on a machine in this manner. The bricks were tested by the lime-sand brick standard DIN 106 and the following values were measured and compared with those for lime-sand bricks:

|  | Hemihydrate Compression-Molded Brick | Lime-Sand Brick |
| --- | --- | --- |
| Dimensions (mm) | 240 × 115 × 71 | 240 × 115 × 71 |
| Density (kg/dm$^3$) | 1.63 | 1.80 |
| Compressive strength | 246 | 150 |

|  | Hemihydrate Compression-Molded Brick | Lime-Sand Brick |
| --- | --- | --- |
| (kp/cm$^2$) | | |

The bricks molded in this way were superior in compressive strength to the corresponding lime-sand bricks at a lower density. They could be used in construction just as conventional lime-sand bricks and bearing walls could be erected from them.

EXAMPLE 2

(not according to the invention since lime was omitted)

The procedure of Example 1 was followed, however the added lime was omitted. The strength of the bricks so prepared was substantially less. The compressive strength at equal density amounted to only 55 kp/cm$^2$. The bricks so prepared were unsuitable for the erection of bearing walls.

EXAMPLE 3

(not according to the invention, since the hemihydrate contained too much water)

Wet calcium sulfate hemihydrate from the filter, having a total water content of 43% by wt. was used in a conventional lime-sand brick press. During the molding process water was expressed, and the shaped objects so prepared did not have sharp edges.

EXAMPLE 4

(not according to the invention since there was too little water in the hemihydrate)

This example is a comparative example wherein there was too little water in the hemihydrate.

Wet calcium sulfate hemihydrate from the filter having a total water content of 17% by wt. was compression-molded after addition of 5% by wt. of calcium hydroxide. The compressive strength of the molded bricks after setting was 210 kp/cm$^2$. However, after storage for eight days in a humid atmosphere the bricks exhibited cracks, which was not the case for the bricks of Examples 1, 5 and 6.

EXAMPLE 5

Wet calcium sulfate hemihydrate from the filter having a total water content of 17% by wt. was mixed with 8% by wt. Ca(OH)$_2$ and at the same time 10% by wt. of water, calculated on the amount of gypsum precipitate, was added. Two hours after the precipitate was removed from the phosphoric acid filter and the lime and water were added the material was molded into bricks at a pressure of 200 kp/cm$^2$. After setting, the bricks had a density of 1.68 kg/dm$^3$ and a compressive strength of 285 kp/cm$^2$.

EXAMPLE 6

96 parts by weight of wet calcium sulfate hemihydrate from the filter having a total water content of 23% was mixed with 3 parts CaO and 1 part of calcium stearate and the mixture was molded at a pressure of 80 kp/cm$^2$. The density of the bricks was 1.61 kg/dm$^3$, and the compressive strength was 250 kp/cm$^2$. After seven days in a humid atmosphere the compressive strength was 230 kp/cm$^2$.

What is claimed as new and sought to be protected by letters patent of the United States is:

1. A shaped gypsum article prepared by a process which comprises:
   (a) controlling the water content of a moist α-calcium sulfate hemihydrate obtained by filtration from the production of phosphoric acid without preliminary purification, drying, or calcining to be in the range of from 20 to 40% by weight,
   (b) mixing the hemihydrate from step (a) with 0.5 to 20% by weight calcium hydroxide or calcium oxide, and
   (c) compression molding the mixture from step (b) without adding any additional binding agent within 8 hours of said mixing,
   wherein said article has a density of from 1.61 to 1.8 kg/dm$^3$ and a compression strength of 200 to 285 kp/cm$^2$ when measured by DIN 106 for the size NF=240×115×71 mm.

2. The article of claim 1, wherein the weight of calcium hydroxide or calcium oxide is at least 3%.

3. The article of claim 1, wherein the weight of calcium hydroxide or calcium oxide is at least 5%.

4. The article of claim 1, wherein the weight of calcium hydroxide or calcium oxide is at least 8%.

5. The article of claim 1 wherein the water content of said mixture is 21-29% by wt.

6. The article of claim 1 wherein the amount of said calcium hydroxide or calcium oxide used is 1-10% by wt.

7. The article of claim 1 wherein said molded articles are allowed to cure for at least 4 hours after molding.

8. The article of claim 1 wherein additional ingredients selected from the group consisting of water-repellants, biocidal agents, conventional fillers, and conventional additives are additionally incorporated into the mixture of step (b).

* * * * *